(12) United States Patent
Joshi et al.

(10) Patent No.: US 9,731,661 B2
(45) Date of Patent: *Aug. 15, 2017

(54) SYSTEM AND METHOD FOR TRAFFIC SIGNAL RECOGNITION

(71) Applicant: Toyota Jidosha Kabushiki Kaisha, Toyota-shi (JP)

(72) Inventors: Avdhut S. Joshi, Ann Arbor, MI (US); Danil V. Prokhorov, Canton, MI (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,381

(22) Filed: Aug. 8, 2014

(65) Prior Publication Data

US 2015/0012200 A1    Jan. 8, 2015

Related U.S. Application Data (63) Continuation of application No. 13/371,722, filed on Feb. 13, 2012, now Pat. No. 8,831,849.

(51) Int. Cl.
*G08G 1/0967* (2006.01)
*B60R 11/04* (2006.01)
*G05D 1/02* (2006.01)

(52) U.S. Cl.
CPC ............ *B60R 11/04* (2013.01); *G05D 1/0276* (2013.01); *G08G 1/0967* (2013.01); *B60R 2300/205* (2013.01)

(58) Field of Classification Search
CPC . B60R 11/04; B60R 2300/205; G05D 1/0276; G08G 1/095; G08G 1/04
See application file for complete search history.

(56) References Cited

U.S. PATENT DOCUMENTS

2003/0023614 A1    1/2003    Newstrom et al.
2005/0133709 A1    6/2005    Mekata et al.
(Continued)

FOREIGN PATENT DOCUMENTS

JP    10-339646    12/1998
JP    2007-257303 A    10/2007
(Continued)

OTHER PUBLICATIONS

Office Action dated Jan. 10,2017 in Japanese Application No. 2013-025303, along with an English translation.
(Continued)

*Primary Examiner* — Yonel Beaulieu
*Assistant Examiner* — Martin Weeks
(74) *Attorney, Agent, or Firm* — Oblon, McClelland, Maier & Neustadt, L.L.P.

(57) ABSTRACT

Detecting traffic signaling of a mobile environment includes receiving image frames captured by an imaging device to detect a traffic signal candidate therefrom based on at least a vehicle location. A score having a predefined value is established for the traffic signal candidate. The traffic signal candidate is tracked by incrementing the score when the traffic signal candidate is determined to appear, based on a probabilistic estimator that indicates an expected value for a location of the traffic signal candidate, in a tracked image frame of the captured image frames. The score is decremented when the traffic signal candidate is determined not to appear, based on the probabilistic estimator, in the tracked image frame. The traffic signal candidate is recognized as a traffic signal based on whether the score is above a specified threshold.

15 Claims, 4 Drawing Sheets

(56) References Cited

U.S. PATENT DOCUMENTS

| | | |
|---|---|---|
| 2005/0134440 A1 | 6/2005 | Breed |
| 2008/0122607 A1 | 5/2008 | Bradley |
| 2009/0060271 A1 | 3/2009 | Kim |
| 2009/0174573 A1 | 7/2009 | Smith |
| 2010/0033571 A1 | 2/2010 | Fujita et al. |
| 2010/0054603 A1 | 3/2010 | Klefenz |
| 2010/0067805 A1 | 3/2010 | Klefenz |
| 2010/0292886 A1 | 11/2010 | Szczerba et al. |
| 2010/0295670 A1 | 11/2010 | Sato et al. |
| 2011/0093178 A1 | 4/2011 | Yamada et al. |
| 2011/0095908 A1 | 4/2011 | Nadeem et al. |
| 2011/0098916 A1 | 4/2011 | Jang |
| 2011/0115646 A1 | 5/2011 | Matsumura |
| 2011/0135155 A1 | 6/2011 | Kudo |
| 2012/0224069 A1 | 9/2012 | Aoki |
| 2012/0288138 A1 | 11/2012 | Zeng |
| 2012/0300089 A1 | 11/2012 | Sbaiz et al. |
| 2013/0027704 A1 | 1/2013 | Davis |
| 2013/0253754 A1 | 9/2013 | Ferguson et al. |

FOREIGN PATENT DOCUMENTS

| | | |
|---|---|---|
| JP | 2008-249479 A | 10/2008 |
| WO | 2011/074087 A1 | 6/2011 |

OTHER PUBLICATIONS

Nakata et al., "Recognition of Traffic Signal from On-board Captured Image Stream" Technical Report of the Institute of Image Information and Television Engineers, The Institute of Image Information and Television Engineers, Feb. 18, 2008 vol. 32 No. 9, p. 121-125 (with English-language Abstract).

SYSTEM AND METHOD FOR TRAFFIC SIGNAL RECOGNITION

CROSS REFERENCE TO RELATED APPLICATIONS

This application is a continuation of U.S. application Ser. No. 13/371,722 filed Feb. 13, 2012, the entire content of which is incorporated herein by reference.

FIELD OF THE DISCLOSURE

This application relates to recognizing the presence of traffic signals from traffic signal candidates detected from image frames captured by a vehicle-mounted camera, by using historical observation data obtained using a probabilistic estimator.

BACKGROUND

The "background" description provided herein is for the purpose of generally presenting the context of the disclosure. Work described herein, to the extent it is described in this background section, as well as aspects of the description which may not otherwise qualify as prior art at the time of filing, are neither expressly or impliedly admitted as prior art.

Traffic signal recognition refers to the process of identifying and marking areas of an image frame that include a traffic signal, for example, a traffic light. A camera obtains the image frames, which are processed individually. Traffic light candidates and areas in the immediate vicinity are determined based on matching an actual traffic template with a template from a template library. The accuracy of traffic signal recognition may be increased by using adaptive templates. Adaptive templates are adjusted according to an expected size of the traffic light candidate and/or the actual traffic light template, which is based on a distance of a vehicle from the traffic light candidate. A best matched template is validated based on a number of possible templates that are matched in size to the actual image frame area corresponding to the traffic light candidate. For example, one of the possible templates may be used when a green circle in the traffic light candidate is illuminated and another of the possible templates may be used when a red circle in the traffic light candidate is illuminated. This is because the red and green circles are at different locations within the traffic light housing.

SUMMARY

This disclosure addresses various problems associated with known traffic signal recognition processes which the inventors have discovered. In particular, in the traffic signal recognition process involving template matching, a template description is required for each template in a template library, which is difficult or impossible to implement for previously unseen traffic lights. Further, adjacent image frames in a captured image frame sequence or video are processed independently, without taking into account temporal and spatial relationships. For example, in order to identify traffic light candidates within an image frame, all areas of the frame must be analyzed, which is a computationally intensive process. In addition, when the image frames include many objects, the process can require even more computer resources. Moreover, objects within the image frame may be incorrectly identified based on a traffic light recognition algorithm used to perform the traffic light detection. This results in an increase in the amount of time a user must spend to correct these misidentifications.

This disclosure is directed to a traffic signal recognition method that, in one non-limiting embodiment, detects candidates for traffic signals based on at least one of a navigational map or a global positioning system (GPS) location of a vehicle. The method uses a color filter to filter image frames obtained from a vehicle-mounted camera. The filtered images are used to detect traffic signal candidates. In a non-limiting embodiment, the traffic signal recognition method is implemented in any of the following, but not limited to: a personal communication device (e.g., cellular phone, data-enabled mobile phone, smartphone) and a portable electronic device (e.g., handheld GPS receiver, portable gaming console, laptop, tablet computer). In another non-limiting embodiment, the device in which the traffic signal recognition method is implemented includes any of the following, but not limited to: an image capturing function; a network connection (e.g., cloud network, the Internet, intranet); and a GPS function.

In another non-limiting embodiment, a distance of the vehicle from the traffic signal candidate is used to determine an expected size of the traffic signal candidate. The expected size of the traffic signal is used to search for traffic signal candidate areas and to examine neighborhoods of possible traffic signal candidate areas. A shape detector is used to reject false traffic signal candidates that are generated due to noise in image frames captured by the camera.

A probabilistic estimator is subsequently employed in a frame-by-frame tracking of the detected traffic light candidates. The tracking process allows evidence to be accumulated in favor of each traffic light candidate when the traffic light candidate is observed in a frame. A traffic light candidate is dropped from consideration when the accumulated evidence falls below a specified threshold, for example, when the traffic light candidate is not observed for a specified amount of time.

In another non-limiting embodiment, the method also includes monitoring traffic signals for an instance in which a particular color light turns off and another color of light is subsequently illuminated. This enables a traffic light candidate to be detected in the immediate vicinity of the light that turned off (e.g., in the up or down directions). Therefore, traffic signal candidates are tracked so as to reliably recognize traffic signals, for example traffic lights, irrespective of the shape and size of a housing for the traffic light. False positive identifications of traffic signals are also rejected based on consistent spatial and/or temporal behavior.

The foregoing paragraphs have been provided by way of general introduction, and are not intended to limit the scope of the following claims. The described embodiments, together with further advantages, will be best understood by reference to the following detailed description taken in conjunctions with the accompanying drawings.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
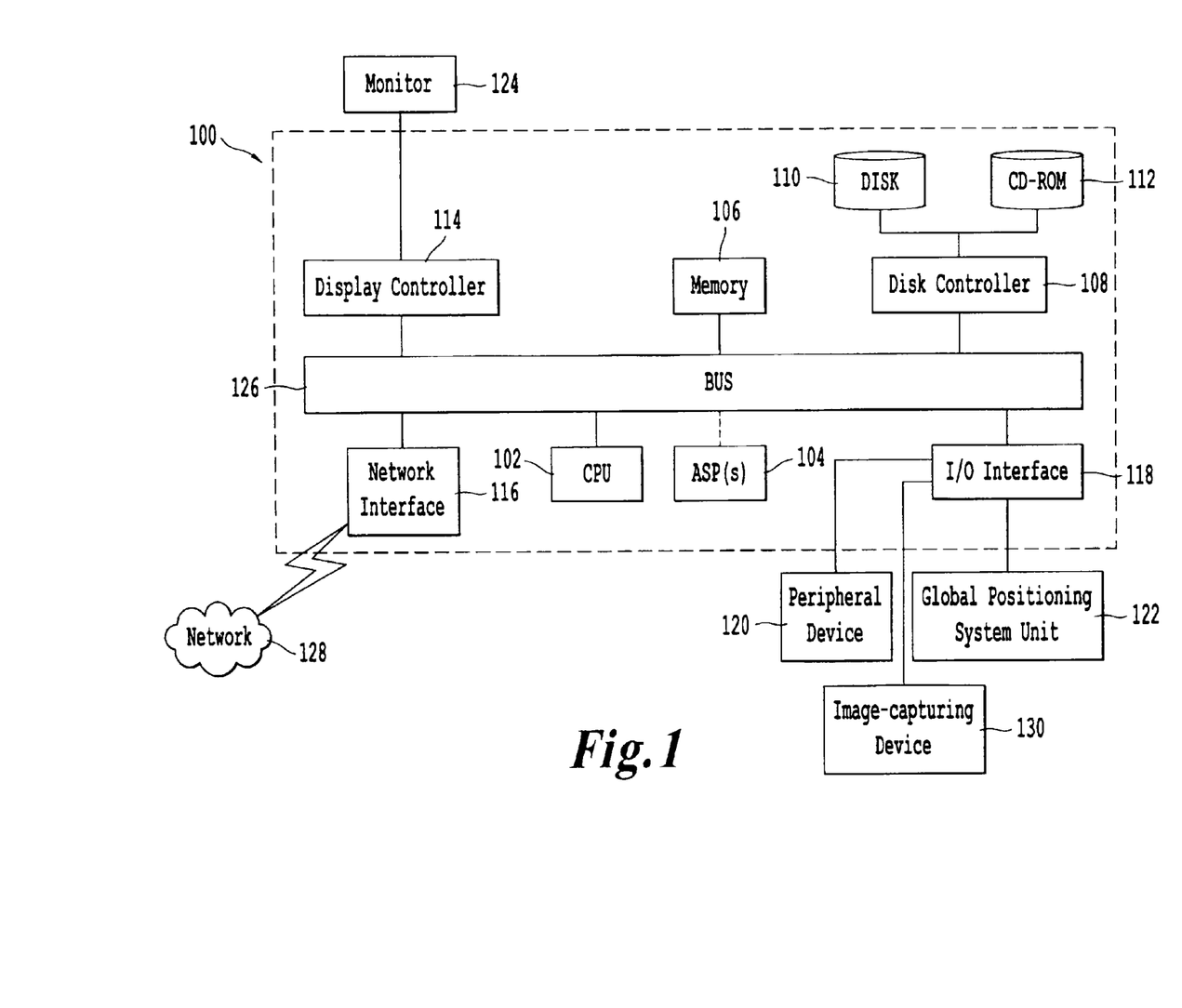
FIG. 1 is a block diagram showing hardware components of a traffic signal recognition system.

In the drawings, reference numerals designate identical or corresponding parts throughout the several views. FIG. 1 shows an exemplary structure for a recognition system 100. The recognition system 100 includes computer hardware components that are either individually programmed or execute program code stored on various recording media. In an exemplary embodiment, the recognition system 100 includes a central processing unit (CPU) 102, one or more application-specific processors (ASPs) 104, memory 106, a disk controller 108 controlling operations of a hard disk drive 110 and/or an optical disk drive 112 (e.g., a CD-ROM drive), a display controller 114, a network interface 116, and an I/O interface 118. The I/O interface 118 is connected to a peripheral device 120, a Global Positioning System (GPS) Unit 122, and an image-capturing device 130. The display controller 114 is connected to a monitor 124. In some implementations, the monitor 124 is a component of the peripheral device 120, which may share a communication/data channel with the monitor 124. In some implementations, the I/O interface 118 is further connected to user-input peripherals such as touch-screen monitor controller, a keyboard and a mouse. Further, the components shown in FIG. 1 share a common BUS 126 for transferring data, and the controllers may include application specific integrated controllers and other programmable components.

The network interface 116 allows the recognition system 100 to communicate via a network 128, such as the Internet. In some aspects, any of the peripheral device 120, the GPS unit 122, and the image-capturing device 130 are coupled to the recognition system 100 via the network 128.

Figure 2:
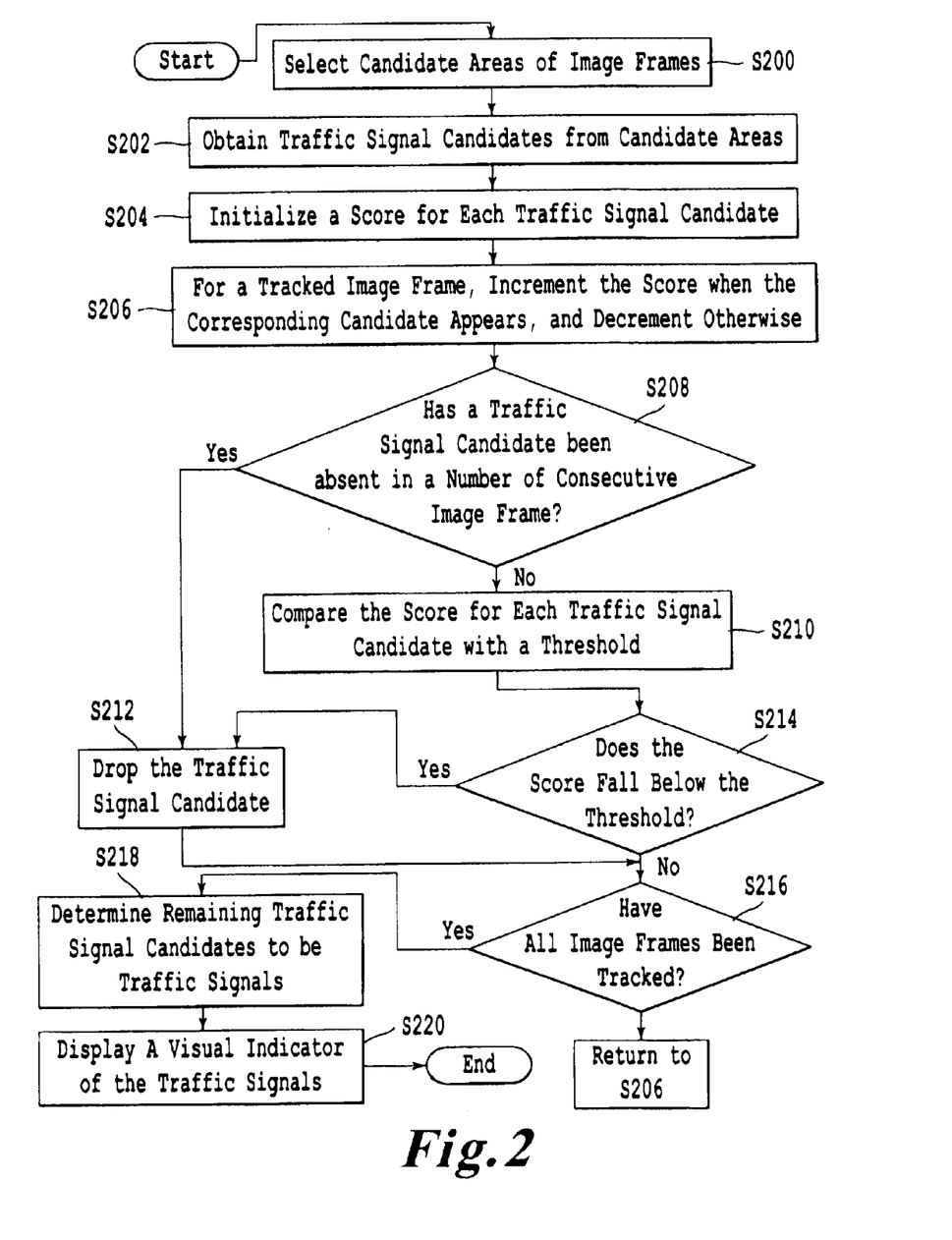
FIG. 2 shows an exemplary algorithm for traffic signal recognition.

Referring now to FIG. 2, in step S200, candidate areas having a relatively high prior probability of including a traffic signal are selected from image frames obtained by a vehicle-mounted camera. In one non-limiting embodiment, a navigational map is used to determine the most likely positions for traffic signals to reduce or eliminate the need to initially search in large areas of the image frames. In another non-limiting embodiment, a GPS location and orientation of the vehicle is used to narrow down a list of candidate areas. In yet another non-limiting embodiment, a saliency map is created from the camera projection.

In step S202, traffic signal candidates are obtained from the candidate areas and are each instantiated as an object. In one non-limiting embodiment, a filter, for example, a top hat filter, is used on specific color channels, of a captured image frame, that correspond to certain frequencies. In Fourier space, the top hat filter selects a desired frequency band by specifying a lower and upper bounding frequency. In another non-limiting embodiment, a shape detector is used on the filtered image frame to reject false traffic signal candidates generated due to noise in the captured image frame. When the traffic signal is known to be a certain distance from the vehicle-mounted camera, for example, based on information obtained from the navigational map, objects of the size corresponding to the given distance having, for example, a round shape are searched. Alternatively, neighborhoods of possible traffic signal candidates on the image frame corresponding to the previous time step are examined. In yet another non-limiting embodiment, a subset of the image frames is searched to reduce usage of processing resources. In this manner, traffic signals of many shapes and forms are accurately recognized. Step S202 also includes monitoring for traffic signals for an instance in which a particular traffic light color turns off and another traffic light color turns on. A traffic signal candidate is therefore detected in the immediate vicinity of the light that turned off (e.g., in the up or down directions).

In step S204, each traffic signal candidate is associated with an initialized score to track and accumulate evidence in favor of the traffic signal candidates.

In step S206, frame-by-frame tracking occurs for each traffic light candidate using a probabilistic estimator. In one non-limiting embodiment, the probabilistic estimator is any of the following, but not limited to: a Kalman filter, an iterated Kalman filter, an extended Kalman filter, a sigma-point filter. The present disclosure describes the probabilistic estimator as implemented by a Kalman filter. However, as understood by those of ordinary skill in the art, the probabilistic estimator is implementable by other filters, such as those set forth above. The probabilistic estimator (e.g., a Kalman filter) is used to track traffic signals. That is, the Kalman filter generates a predicted location for each traffic signal candidate based on previous estimations and observations of traffic signal candidate in previous image frames. The prediction is modeled by the state dynamics of the Kalman filter and is based on information about the ego-vehicle motion (i.e., the motion of the camera in the vehicle), the relatively stationary nature of traffic signals and in one non-limiting embodiment, the size of the traffic signal candidate, to improve the outcome of the tracking algorithm (described in further detail below).

The tracking algorithm accumulates evidence, i.e., by incrementing the score each time a traffic signal candidate appears in a tracked image frame, in favor of each traffic signal candidate. The score associated with the traffic signal candidate is decremented when the traffic signal candidate does not appear in the tracked image frame. More particularly, the Kalman filter is updated based on x-, y-, and in one non-limiting embodiment, z-coordinate information for each traffic signal candidate as well as a probability, P, and a prediction is generated for the most likely location of the traffic signal, based on the previous detection or classification. The prediction is associated with a traffic signal candidate in the stored list of previously observed traffic signal candidates. If a new traffic signal candidate is observed, a new Kalman filter and a new object are initialized. A Kalman filter posterior update is made using a new observation, and the score is incremented for observed traffic signals. In one non-limiting embodiment, when the prediction is not available for the previously observed objects (e.g., due to their temporary occlusions), the score is decremented.

A Kalman filter is based on a linear dynamic system discretized in the time domain. It is modeled based on a Markov chain built on linear operators perturbed by Gaussian noise. The state of the system is represented as a vector of real numbers. At each discrete time increment, a linear operator is applied to the state to generate a new state, mixed with some noise, and information from controls in the system, if they are known. Then, another linear operator mixed with more noise generates the observed outputs from the true ("hidden") state:

$$x_k = F_k x_{k-1} + B_k u_k + w_k \qquad \text{(Eq. 1)}$$

where $F_k$ is the state transition model which is applied to the previous state $x_{k-1}$;

$B_k$ is the control-input model which is applied to the control vector $u_k$; and $w_k$ is the process noise which is assumed to be drawn from a zero mean multivariate normal distribution with covariance $Q_k$.

$$w_k \sim N(0, Q_k) \quad \text{(Eq. 2)}$$

At time k an observation (or measurement) $z_k$ of the true state $x_k$ is made according to $$z_k = H_k x_k + v_k \quad \text{(Eq. 3)}$$

where $H_k$ is an observation model which maps a true state space into an observed space; and $v_k$ is the observation noise which is assumed to be zero mean Gaussian white noise with covariance $R_k$.

$$v_k \sim N(0, R_k) \quad \text{(Eq. 4)}$$

Thus, the process is robust with respect to instantaneous classification errors (e.g., false positives due to noise, which typically do not propagate temporally) and temporary occlusions of the traffic signal candidate.

Also in step S206, the traffic signal candidates are monitored for changes, for example, light changes. The monitoring is initiated when the light turns off and detects any traffic signal candidates in the immediate vicinity of the light that turned off (e.g., in the up or down directions) having a different light illuminated. An object is instantiated and a filter is initialized for the new traffic light candidate. Note that shape of the new traffic signal candidate can change, at least slightly, based on different angles of viewing and due to different orientation (e.g., yaw and pitch angles) of the on-board camera in the vehicle.

In step S208, a determination is made, based on the Kalman filter and the tracking algorithm, as to whether the traffic signal candidate has been absent in a specified number of consecutive image frames. The traffic signal candidate is dropped from consideration, in step S212, if traffic signal candidate has been absent in the specified number of consecutive image frames. If the traffic signal candidate has not been absent in the specified number of consecutive image frames, the process proceeds to step S210 in which the score is compared with a predetermined threshold. A determination as to whether the score is less than the predetermined threshold in step S214 and if so, the traffic signal candidate is dropped as a candidate in step S212.

Otherwise, the process continues to step S216 where it is determined whether each image frame to be tracked has been tracked and if so, the remaining traffic signal candidates are recognized and classified as traffic signals in step S218. If not, the process returns to step S206. In step S220, a visual indicator of the recognized traffic signals determined in step S218 is displayed on a screen, dashboard, windshield, or other vehicle-mounted display, and the process ends.

Figure 3:
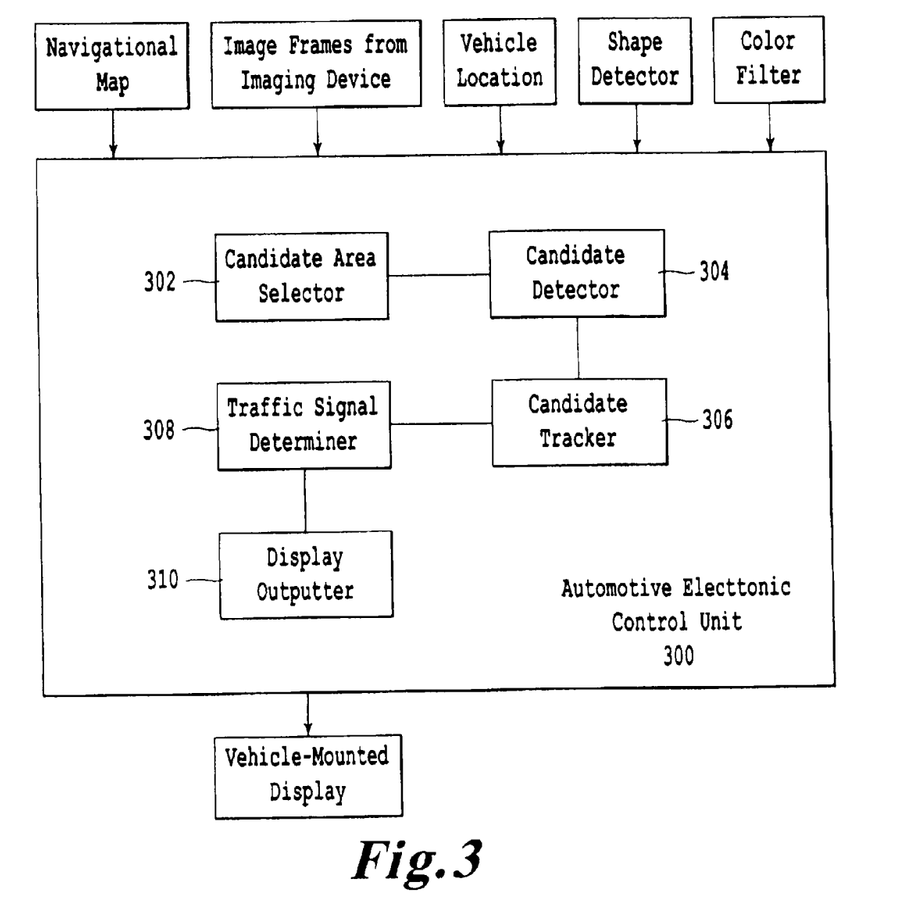
FIG. 3 shows an exemplary automotive electronic control unit implementing traffic signal recognition.

Referring now to FIG. 3, a system diagram of an automotive electronic control unit 300 is shown. FIG. 3 illustrates a functional relationship of hardware as modified by software or computer-executable instructions. That is, the automotive electronic control unit 300 shown in FIG. 3 corresponds to hardware, or a combination of hardware and software. More particularly, the automotive electronic control unit is implemented by at least a portion of the tangible hardware shown in FIG. 1 and optionally, software or computer-executable instructions corresponding to the algorithm shown in FIG. 2.

The automotive control unit 300 receives image frames from a vehicle-mounted imaging device, for example, a video camera. The automotive control unit 300 also receives any one or more of the following, but not limited to: a navigational map including for example, streets and intersection locations, a vehicle location and orientation (e.g., pose or GPS coordinates), a shape detector algorithm, and a color filter algorithm. Using the image frames, a candidate area selector 302 uses either or both of the navigational map and the vehicle location and orientation to determine candidate areas for traffic signal candidates in each of the image frames. The image frames, with the identified candidate areas, are passed to a candidate detector 304.

The candidate detector 304 detects traffic signal candidates from the candidate area and each is associated with an object or data structure. Alternatively or additionally, the traffic signal candidates are detected based on an analysis of the entire image frame. As described above, the traffic signal candidates are obtained by employing either or both a color filter and a shape detector. A list of traffic signal candidates is passed to a candidate tracker 306.

As described above, each traffic signal candidate is associated with an initialized score. A probabilistic estimator, for example, a Kalman filter, is used to track the traffic signal candidates. As described above, the Kalman filter generates a predicted location for each traffic signal candidate based on previous estimations and observations of traffic signal candidate in previous image frames. Evidence in favor of the traffic signal candidates is accumulated by incrementing a score associated with a traffic signal candidate each time the traffic signal candidate appears in a tracked image frame. The candidate tracker 306 decrements the score associated with the traffic signal candidate when the traffic signal candidate does not appear in the tracked image frame. When the score associated with the traffic signal candidate falls below a predetermined threshold, or when the traffic signal candidate has not appeared in a specified consecutive number of image frames, the traffic signal candidate is dropped and its associated object is removed from the list. The list of traffic signal candidates is then passed to a traffic signal determiner 308.

The traffic signal determiner 308 determines whether each image frame to be tracked has been tracked and if so, determines that the remaining traffic signal candidates in the list are classified and recognized as traffic signals. Position information corresponding to the traffic signal candidates is passed to a display outputter 310. The display outputter 310 outputs a signal to draw a visual indication to be displayed on at least one of, but not limited to: a screen, dashboard, windshield, vehicle-mounted display, personal communication device, and a portable electronic device. For example, the visual indication is a colored polygon or free-form shape enclosing or otherwise indicating a location corresponding to the recognized traffic signal on the display. As another example, the visual indication is patterned to assist color-blind or color-impaired drivers. As yet another example, the visual indication is text, for example, words such as "GO", "STOP", "READY", "RED", "GREEN", or "YELLOW".

In another non-limiting embodiment, either in addition or in alternatively from outputting a visual indication, position information corresponding to the traffic signal candidates determined by the traffic signal determiner 308 is used as input to a vehicle control system. For example, the position information can be input to a vehicle controller that directs an active safety module that controls the vehicle to automatically stop, go, or accelerate.

Figure 4:
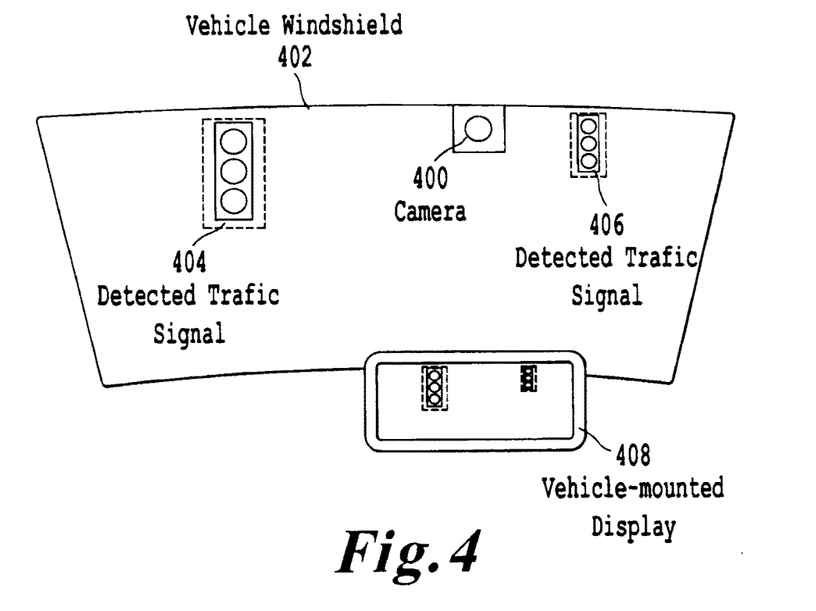
FIG. 4 illustrates a view from a vehicle including the traffic signal recognition system and displaying recognized traffic lights.

In FIG. 4, a view from inside the vehicle is illustrated. A camera 400 is mounted near a windshield 402 of the vehicle. In one non-limiting embodiment, the camera 400 mounted outside of or on top of the vehicle. As will be understood by one of ordinary skill in the art, the camera 400 is mountable anywhere on or around the vehicle as long as image frames showing approaching terrain (with a sufficiently wide angle of view) are captured. In one non-limiting embodiment, detected traffic signals 404 and 406 are enclosed with dashed line boxes that are illuminated, or otherwise indicated, on the vehicle windshield 402. In another non-limiting embodiment, the detected traffic signals are enclosed with dashed line boxes that are illuminated, or otherwise indicated, on a vehicle-mounted display 408.

Figure 5:
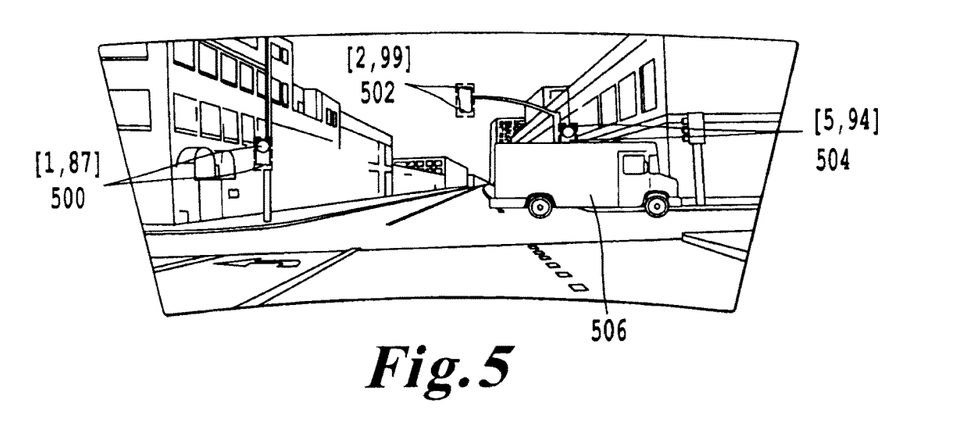
FIG. 5 is an exemplary image frame that indicates recognized traffic signals.

In FIG. 5, a sample image frame including visual indicia around three traffic signals is shown. Two traffic signals 500 and 502 are recognized with a specified degree of confidence, and therefore, are marked with boxes of a particular color, shape, or pattern. The third traffic signal 504, which is temporarily occluded by a passing vehicle 500, but the presence of the traffic signal 504 is still recognized based on evidence accumulated during detection results in the previous image frames and the Kalman filtering for the candidate corresponding to the specified traffic signal. In FIG. 5, each traffic signal 500, 502, and 504 is also shown with its index in a list of traffic signal candidates and an accumulated evidence counter that is based on, for example, a number of image frames that the traffic signal candidate appears in. In the exemplary illustration of FIG. 5, traffic signal 500 has an index of 1 and an accumulated evidence counter of 87; traffic signal 502 has an index of 2 and an accumulated evidence counter of 99; and traffic signal 504 has an index of 5 and an accumulated evidence counter of 94. The index of 5 for the traffic signal 504 indicates that traffic signal candidates at indices 3 and 4 were dropped as candidates during the filtering.

Obviously, numerous modifications and variations of the present disclosure are possible in light of the above teachings. It is therefore to be understood that within the scope of the applied claims, the invention may be practiced otherwise than as specifically described herein.

What is claimed is:

1. A controller for detecting traffic signaling of a mobile environment, comprising:
    processing circuitry configured to:
        receive image frames captured by an imaging device to detect a traffic signal candidate therefrom based on at least a location of a vehicle, independently of a size and a shape of a traffic light housing associated with the traffic signal candidate;
        establish a score having a predefined value for the traffic signal candidate and track the traffic signal candidate by incrementing the score when the traffic signal candidate is determined to appear, based on a probabilistic estimator that indicates an expected value for a location of the traffic signal candidate, in a tracked image frame of the captured image frames, and decrementing the score when the traffic signal candidate is determined not to appear, based on the probabilistic estimator, in the tracked image frame;
        determine whether the traffic signal candidate is a traffic signal based on whether the score is above a specified threshold; and
        output a visual indicator signal that specifies a location of the traffic signal on a windshield of the vehicle or a screen in the vehicle.

2. The controller according to claim 1, wherein the circuitry is further configured to determine that the traffic signal candidate is not a traffic signal when the traffic signal candidate appears in a specified number of consecutive image frames of the captured image frames or less, the specified number corresponding to the specified threshold.

3. The controller according to claim 1, wherein the probabilistic estimator is implemented by one of a Kalman filter, an iterated Kalman filter, an extended Kalman filter, and a sigma-point filter.

4. The controller according to claim 1, wherein the probabilistic estimator takes as an input an ego-vehicle motion to determine the expected value for the location of the traffic signal candidate in the tracked image frame.

5. The controller according to claim 1, wherein the traffic signal candidate is determined to be the traffic signal independently of whether the traffic signal changes color during tracking with respect to the captured image frames.

6. The controller according to claim 1, wherein the circuitry is further configured to instantiate a new probabilistic estimator for each time a new traffic signal candidate is detected.

7. A method of detecting automotive traffic signaling in a mobile environment, comprising:
    receiving image frames, captured by an imaging device, to detect a traffic signal candidate therefrom based on at least a location of a vehicle independently of a size and a shape of a traffic light housing associated with the traffic signal candidate;
    establishing a score having a predefined value for the traffic signal candidate and tracking, by processing circuitry, the traffic signal candidate by incrementing the score when the traffic signal candidate is determined to appear, based on a probabilistic estimator that indicates an expected value for a location of the traffic signal candidate, in a tracked image frame of the captured image frames, and decrementing the score when the traffic signal candidate is determined not to appear, based on the probabilistic estimator, in the tracked image frame;
    determining, by the processing circuitry, whether the traffic signal candidate is a traffic signal based on whether the score is above a specified threshold; and
    outputting, by the processing circuitry, a visual indicator signal that specifies a location of the traffic signal on a windshield of the vehicle or a screen in the vehicle.

8. The method according to claim 7, wherein the traffic signal candidate is determined to be the traffic signal when the traffic signal candidate is occluded in at least one tracked image frame of the captured image frames.

9. The method according to claim 7, further comprising:
    controlling, by the processing circuitry, vehicular movement including at least one of accelerating, decelerating, and braking, when it is determined that the traffic signal candidate is the traffic signal.

10. A non-transitory computer-readable storage medium having computer readable program codes embodied in the computer readable storage medium for detecting automotive traffic signaling in a mobile environment, the computer readable program codes that, when executed, cause a computer to execute:
    receiving image frames, captured by an imaging device, to detect a traffic signal candidate therefrom based on at least a location of a vehicle independently of a size and a shape of a traffic light housing associated with the traffic signal candidate;

establishing a score having a predefined value for the traffic signal candidate and tracking the traffic signal candidate by incrementing the score when the traffic signal candidate is determined to appear, based on a probabilistic estimator that indicates an expected value for a location of the traffic signal candidate, in a tracked image frame of the captured image frames, and decrementing the score when the traffic signal candidate is determined not to appear, based on the probabilistic estimator, in the tracked image frame;

determining whether the traffic signal candidate is a traffic signal based on whether the score is above a specified threshold; and outputting a visual indicator signal that specifies a location of the traffic signal on a windshield of the vehicle or a screen in the vehicle.

11. The non-transitory computer-readable storage medium according to claim 10, wherein the traffic signal candidate changes shape in at least one of the captured image frames based on an orientation of the imaging device.

12. The non-transitory computer-readable storage medium according to claim 10, wherein the traffic signal candidate changes shape in at least one of the captured image frames based on a viewing angle of the imaging device.

13. The non-transitory computer-readable storage medium according to claim 10, further comprising:

outputting at least one of a patterned and textual visual indicator specifying the traffic signal to a vehicle-mounted display.

14. The non-transitory computer-readable storage medium according to claim 10, further comprising:

controlling vehicular movement including at least one of accelerating, decelerating, and braking, when it is determined that the traffic signal candidate is the traffic signal.

15. The controller according to claim 1, wherein the circuitry is further configured to control vehicular movement including at least one of accelerating, decelerating, and braking, when it is determined that the traffic signal candidate is the traffic signal.

* * * * *